United States Patent
Dzyuba (10) Patent No.: US 9,778,047 B2
(45) Date of Patent: Oct. 3, 2017

(54) METHODS AND APPARATUS FOR ROUTE COMPARISON

(71) Applicant: TomTom Development Germany GmbH, Amsterdam (NL)

(72) Inventor: Tetyana Dzyuba, Berlin (DE)

(73) Assignee: TomTom Navigation B.V., Amsterdam (NL)

(*) Notice: Subject to any disclaimer, the term of this patent is extended or adjusted under 35 U.S.C. 154(b) by 0 days.

(21) Appl. No.: 14/758,592

(22) PCT Filed: Dec. 31, 2013

(86) PCT No.: PCT/EP2013/078170
§ 371 (c)(1),
(2) Date: Jun. 30, 2015

(87) PCT Pub. No.: WO2014/102392
PCT Pub. Date: Jul. 3, 2014

(65) Prior Publication Data
US 2015/0369615 A1    Dec. 24, 2015

(30) Foreign Application Priority Data
Dec. 31, 2012 (GB) .................................. 1223520.6

(51) Int. Cl.
*G01C 21/10* (2006.01)
*G06F 15/173* (2006.01)
(Continued)

(52) U.S. Cl.
CPC ............. *G01C 21/30* (2013.01); *G01C 21/32* (2013.01)

(58) Field of Classification Search
USPC ......................................... 701/409; 709/225
See application file for complete search history.

(56) References Cited

U.S. PATENT DOCUMENTS

| | | | |
|---|---|---|---|
| 6,356,836 B1 * | 3/2002 | Adolph | G01C 21/26 701/410 |
| 6,487,310 B1 | 11/2002 | Bishop et al. | |
| 6,542,473 B1 * | 4/2003 | Song | H04L 45/04 370/254 |
| 7,133,769 B2 * | 11/2006 | Jung | G06Q 10/047 701/414 |
| 7,219,159 B2 * | 5/2007 | Mouri | H04L 45/12 370/238 |
| 8,160,037 B2 * | 4/2012 | Lee | H04W 4/20 370/338 |

(Continued)

FOREIGN PATENT DOCUMENTS

| CN | 1781012 A | 5/2006 |
|---|---|---|
| CN | 102197279 A | 9/2011 |

OTHER PUBLICATIONS

Thomas Eiter and Heikki Mannila: "Computing Discrete Frechet Distance", Apr. 25, 1994, XP002722389, Retrieved from the Internet: URL: http:// citeseerx.ist.psu.edu/viewdoc/download?doi=10.1.1.90.937&rep=rep1&type=pdf [retrieved on Mar. 25, 2014].

(Continued)

*Primary Examiner* — Tyler Paige (57) ABSTRACT

Embodiments of the present invention provide a computer implemented method of route comparison, comprising receiving data indicative of first and second routes between a start location and a destination location wherein the first and second routes are generated using digital map data, determining nodes of the first and second routes having a minimum coupling distance, wherein the minimum coupling distance is determined based upon nodes of the first and second routes constrained to within a predetermined distance of a current node of each route, and determining a similarity index for the first and second routes based upon the minimum coupling distance and a threshold data coupling distance.

21 Claims, 5 Drawing Sheets

(51) Int. Cl.
*G01C 21/30* (2006.01)
*G01C 21/32* (2006.01)

(56) References Cited

U.S. PATENT DOCUMENTS

| | | | | |
|---|---|---|---|---|
| 8,451,807 | B2* | 5/2013 | Yi | H04L 45/124 370/338 |
| 8,760,995 | B1* | 6/2014 | Gautam | H04W 40/10 370/216 |
| 8,918,282 | B1* | 12/2014 | Stenneth | G08G 1/0112 701/117 |
| 2003/0023751 | A1* | 1/2003 | Mouri | H04L 45/12 709/241 |
| 2007/0005238 | A1 | 1/2007 | Adachi | |
| 2010/0228574 | A1* | 9/2010 | Mundinger | G06Q 10/047 705/4 |
| 2012/0053823 | A1 | 3/2012 | Wilson | |
| 2012/0166642 | A1* | 6/2012 | Saint Clair | H04L 67/125 709/225 |
| 2014/0136107 | A1* | 5/2014 | Pfeifle | G01C 21/32 701/533 |

OTHER PUBLICATIONS

Search Report for United Kingdom Application No. GB1223520.6 dated May 1, 2013.
Sotiris Brakatsoulas, Dieter Pfoser, Randall Salas, Carola Wenk: "On map-matching vehicle tracking data", Proceedings of the 31st VLDB Conference, Oct. 4, 2005-Oct. 6, 2005 pp. 853-864, XP040026470. ACM, USA ISBN: 1-59593-154-6 abstract; figures 7, 8 Section 3.
Wenk C et al: "Addressing the Need for Map-Matching Speed: Localizing Globalb Curve-Matching Algorithms", Scientific and Statistical Database Management, 2006. 18th International Conference on, Jul. 3, 2006-Jul. 5, 2006, pp. 379-388, XP010927108, Vienna Austria DOI: 10.1109/SSDBM.2006.11 ISBN: 978-0-7695-2590-7 Section 2.3.
Kevin Buchin et al: "Exact algorithms for partial curve matching via the Frechet distance", Proc. 20th ACM-SIAM Symposium on Discrete Algorithms, Jan. 4, 2009-Jan. 6, 2009, pp. 645-654, XP058023867, ISBN: 978-0-898716-80-1 abstract.
Chen D et al: "Approximate map matching with respect to the Frechet distance", 2011 Proceedings of the 13th Workshop on Algorithm Engineering and Experiments, ALENEX 2011, pp. 75-83, XP002722390, abstract.
Sudarshan S Chawathe ED—Anonymous: "Segment-Based Map matching", Intelligent Vehicles Symposium, Jun. 1, 2007, pp. 1190-1197, XP031127110, IEEE ISBN:978-1-4244-1067-5 abstract.
Kevin Buchin et al: "Finding long and similar parts of trajectories", Computational Geometry, vol. 44, No. 9, May 11, 2011, pp. 465-476 XP028236554, Elsevier, Amsterdam, NL ISSN: 0925-7721, DOI: 10.1016/J.COMEGO.2011205.004 [retrieved on May 14, 2011] abstract; figures 1-3.
International Search Report for International Application No. PCT/EP2013/078170 dated Apr. 30, 2014.

* cited by examiner

METHODS AND APPARATUS FOR ROUTE COMPARISON

CROSS-REFERENCES TO RELATED APPLICATIONS

This application is the National Stage of International Application No. PCT/EP2013/078170, filed Dec. 31, 2013, and designating the United States, which claims benefit to United Kingdom Patent Application No. 1223520.6 filed Dec. 31, 2012. The entire content of these applications is incorporated herein by reference.

FIELD OF THE INVENTION

Embodiments of the present invention relate to methods and apparatus for comparing routes. In particular, although not exclusively, embodiments of the invention may determine a similarity score indicative of the similarity between first and second routes.

BACKGROUND TO THE INVENTION

It is sometimes necessary to compare a plurality of routes determined with respect to map data. The routes may be between an origin and destination pair of locations. For example, it may be desired to compare routes between the origin and destination locations which have been calculated using different digital map data, such as map data from different sources or different versions of the same map data. The map data may be map data in different formats such as in a proprietary format of a mapping data company and another format.

It is known to compare curves, which may represent the routes, by determining a Fréchet distance $\delta_F$ between the two curves. The Fréchet distance is a measure of similarity between curves which takes into account the location and ordering of points along the curves. The Fréchet distance may be thought of as a man walking along one curve with a dog walking along another curve. The man is holding a lead connected to the dog. Both the man and dog may vary their speed, but neither can backtrack. The Fréchet distance is the shortest length of lead which may be used.

The journal article by Thomas Eiter and Heikki Mannila entitled "Computing Discrete Fréchet Distance", Tech. Report CD-TR 94/96 (1994), Christian Doppler Laboratory for Expert Systems, TU Vienna, Austria considered a discrete variation of the Fréchet distance for polygonal curves. The variation is known as the coupling distance $\delta_{DF}$ which looks at all possible couplings between end points of line segments of the polygonal curves. The coupling distance provides a good approximation to the Fréchet distance and represents an upper bound. The coupling distance is also quicker to calculate in $O(pq)$ time compared to $O(pq \log^2 pq)$ for the Fréchet distance wherein p and q are the number of segments on polygonal curves.

It is an object of embodiments of the invention to at least mitigate one or more of the problems of the prior art.

SUMMARY OF THE INVENTION

In accordance with a first aspect of the present invention, there is provided a computer implemented method of route comparison, comprising:

receiving data indicative of first and second routes between a start location and a destination location wherein the first and second routes are generated using digital map data;

determining nodes of the first and second routes having a minimum coupling distance, wherein the minimum coupling distance is determined based upon nodes of the first and second routes constrained to within a predetermined distance of a current node of each route; and determining a similarity index for the first and second routes based upon the minimum coupling distance and a threshold coupling distance.

The nodes having the minimum coupling distance may be determined based upon the current node of each route and a predetermined number of further nodes of the route. The nodes having the minimum coupling distance may be determined based upon the current node of each route and one further node of the route. The nodes having the minimum coupling distance may be determined by calculating a coupling distance between the nodes of the first and second routes within the predetermined distance of the current node. The nodes having the minimum coupling distance may be determined without calculating a coupling distance between all combinations of nodes of the first and second routes. The nodes having the minimum coupling may be determined by calculating a coupling distance between only a subset of combinations of nodes of the first and second routes. The step of determining nodes having the minimum coupling distance may comprise selecting a node of each route from amongst the nodes within the predetermined distance of the current node of each route.

The step of determining the similarity index for the first and second routes may comprise comparing the coupling distance of each pair of nodes against the threshold coupling distance. The method of the invention may comprise determining a total number of pairs of nodes within the threshold coupling distance. The similarity index may indicate a percentage of nodes within the threshold coupling distance.

The first route may be generated using a first map database and the second route may be generated using a second map database; the first map database may be the same as, or a different version of, the second map database.

The method of the invention may comprise interpolating the data indicative of the first and second routes such that each route comprises a node at least every predetermined distance.

It will be appreciated that the methods in accordance with the present invention may be implemented at least partially using software. It will this be seen that, when viewed from further aspects, the present invention extends to a computer program product comprising computer readable instructions adapted to carry out any or all of the method described herein when executed on suitable data processing means. The invention also extends to a computer software carrier comprising such software. Such a software carrier could be a physical (or non-transitory) storage medium or could be a signal such as an electronic signal over wires, an optical signal or a radio signal such as to a satellite or the like.

In accordance with another aspect of the present invention, there is provided a computing device comprising:

a memory storing data indicative of first and second routes between a start location and a destination location wherein the first and second routes are generated using digital map data; and a processor arranged to execute a route comparison module by determining nodes of the first and second routes having a minimum coupling distance, wherein the minimum coupling distance is determined based upon nodes of the first and second routes constrained to within a predetermined distance of a current node of each route, and to determining a similarity index for the first and second routes based upon the minimum coupling distance and a threshold coupling distance.

The present invention in either of these aspects may include any or all of the features described in relation to the first aspect of the invention, and vice versa, to the extent that they are not mutually inconsistent. Thus, if not explicitly stated herein, a server and/or mobile device in accordance with the present invention may comprise means for carrying out any of the steps of the method described.

The means for carrying out any of the steps of the method may comprise a set of one or more processors configured, e.g. programmed, for doing so. A given step may be carried out using the same or a different set of processors to any other step. Any given step may be carried out using a combination of sets of processors.

The computing device may be a portable device comprising navigation software for determining the first and second routes.

The computing device may be a computer arranged to receive the data indicative of first and second routes from one or more wireless devices.

The present invention in accordance with any of its further aspects or embodiments may include any of the features described in reference to other aspects or embodiments of the invention to the extent it is not mutually inconsistent therewith.

Advantages of these embodiments are set out hereafter, and further details and features of each of these embodiments are defined in the accompanying dependent claims and elsewhere in the following detailed description.

BRIEF DESCRIPTION OF THE FIGURES

Embodiments of the invention will now be described by way of example only, with reference to the accompanying figures, in which.

DETAILED DESCRIPTION OF PREFERRED EMBODIMENTS

Embodiments of the invention determine a coupling distance between two routes. The coupling distance is determined based upon polyline nodes within a predetermined distance. That is, unlike in prior art methods where a minimum distance is determined between all polyline nodes, embodiments of the present invention are constrained to only consider nodes within a predetermined number of nodes, as will be explained. Advantageously, embodiments of the invention may determine a minimum coupling distance using less computational resources, such as processor power and/or memory. A matrix may be used in the prior art to store coupling distances between all combinations of nodes in the routes, whereas embodiments of the invention only partially calculate coupling distances between the nodes, i.e. partially filling the matrix. Thus embodiments of the invention require fewer calculations and less memory usage, as will be appreciated.

Figure 1:
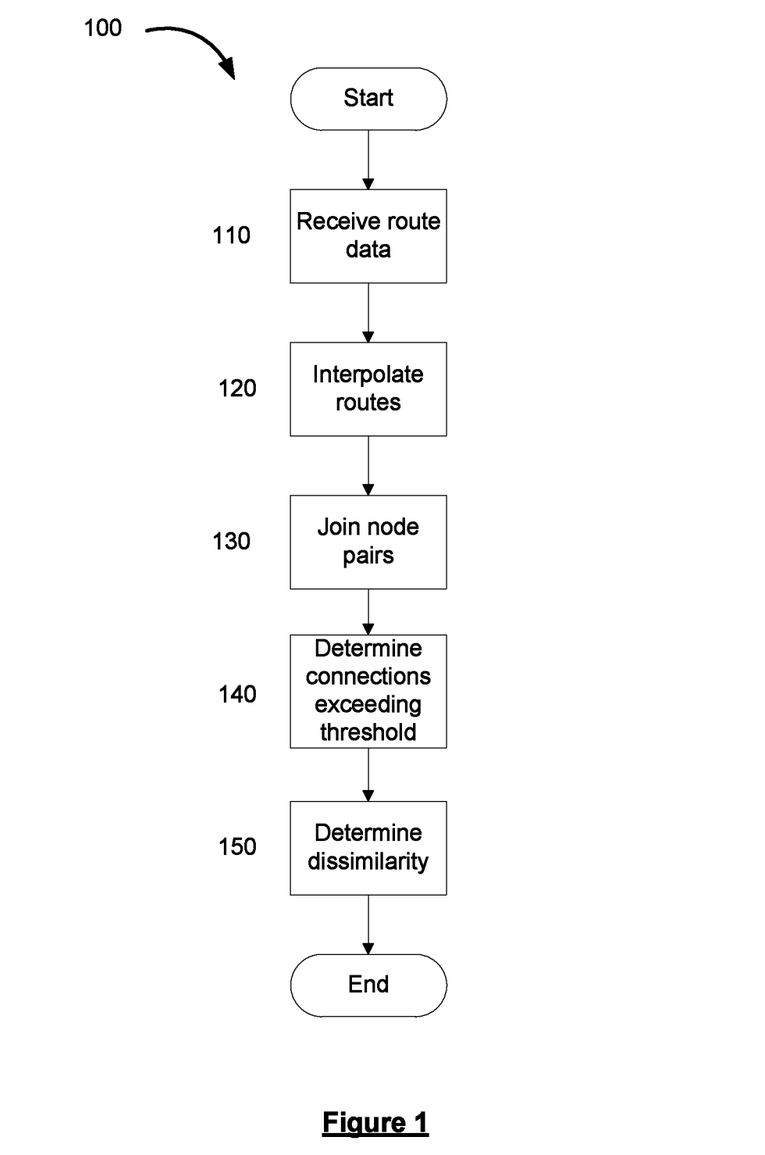
FIG. 1 illustrates a method according to an embodiment of the invention.

FIG. 1 illustrates a method 100 according to an embodiment of the invention. The method 100 is a method of determining a similarity of first and second routes. The first and second routes are routes determined between start and destination locations. In some embodiments the first and second routes may be determined with respect to first and second map databases. However, in other embodiments the first and second routes may be determined using different route planning software, e.g. different versions of the same route planning software or software from different companies.

The method 100 may be performed by a route comparison module of a computing device. The computing device may be a portable computing device, such as mobile telephone, tablet or laptop computer, portable digital assistant or the like. The portable computing device may include software for providing navigation device functionality such as route planning and providing navigation instructions to a user. Alternatively, the portable computing device may be a dedicated navigation device such as that provided by TomTom International BV. It will be realised that these are merely examples of portable computing devices and embodiments of the present invention are not limited in this respect. It will be realised that such portable computing devices may have relatively limited computing resources, such as processor power and/or memory or data storage capacity. Therefore embodiments of the invention may be useful in reducing a load on these computing resources. Alternatively, embodiments of the method 100 may be performed by route comparison module of a computer system, such as a server which may be communicatively coupled to one or more portable computing devices to receive route data indicative of the first and second routes. Alternatively the computer system may be coupled to first and second sources of map data such as first and second map databases.

The method comprises a step 110 of receiving route data indicative of the first route between the start and destination locations and data indicative of the second route between the start and destination locations.

The route data indicative of the first and second routes may be received by the route comparison module from another module of the computing device or computer system. For example, in one embodiment the route comparison module may receive the route data from a route determination module of the computing device or computer system, or in another embodiment the route comparison module may receive the route data from a communication module of the computer system acting as a proxy to receive the route data from one or more portable computing devices, or from a map database comparison module communicatively coupled to first and second map databases. The first and second map databases may comprise map data of differing versions or from different sources. Thus it will be appreciated that step 110 does not necessarily imply that the route data is received from a source external to the device or system executing the route comparison module.

Figure 2:
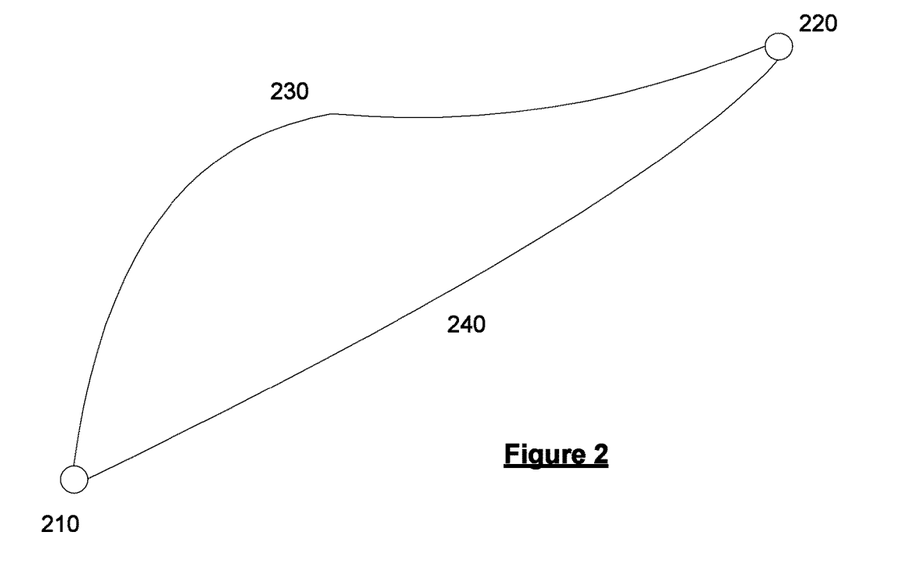
FIG. 2 illustrates two routes between a start location and a destination location.

FIG. 2 illustrates a start location 210 and a destination location 220 in digital map data. A first route 230 has been determined between the start location 210 and the destination location 220 and route data received in step 110 indicative of the first route. Similarly, a second route 240 has been determined between the start and destination locations 210, 220. The first and second routes 230, 240 may have been determined using different route planning software, e.g. based upon different routing criteria, and the same map data. Alternatively, the first and second routes may be determined based upon the same routing criteria with respect to first and second map data. In either event, the first and second routes will typically be similar, but differ in at least some road segments.

Step 120 comprises interpolating the first and second route data. Step 120 provides each route with nodes at predetermined distance intervals. That is, step 120 ensures that each route comprises at least one node within each predetermined distance interval.

In some embodiments each route may be represented as one or more curves, such as indicated by a mathematical equation. In these cases step 120 may comprise converting the curves to poly lines i.e. representing the routes as formed by a plurality of line segments approximating the one or more curves of each route. In this case, each line segment has a maximum length of the predetermined interval.

In other embodiments the received routes may be formed by a plurality of line segments. In these embodiments step 120 may comprise checking that each line segment is less than the predetermined distance. If one or more line segments are longer than the predetermined distance, such that nodes at end of the line segments are spaced apart by more than the predetermined distance, then step 120 comprises interpolating the line segments to introduce additional nodes. The additional nodes may be spaced apart at intervals of the predetermined distance, or such that each line segment comprises a node at least every predetermined distance. The predetermined distance may be n meters wherein n is selected to balance computing resource requirements of the method 100 and precision of route comparison. For example, n may be 500 meters although this is merely exemplary.

Figure 3:
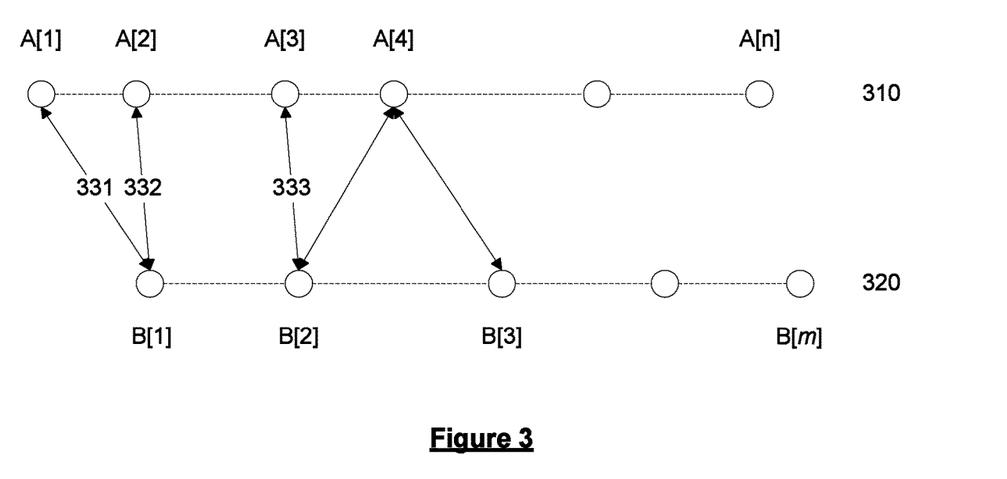
FIG. 3 illustrates two series of nodes representing the two routes according to an embodiment of the invention.

FIG. 3 illustrates route data indicative of first and second interpolated routes 310, 320. The first route A comprises a plurality of nodes indicated as A[1], A[2], ... A[n] and the second route B comprises a plurality of nodes indicated as B[1], B[2], ... B[m]. It will be noted that the portion of the routes shown in FIG. 3 is an intermediate portion of the first and second routes 310, 320 not comprising the start or destination nodes for illustration purposes.

Step 130 comprises determining pairs of nodes from the first and second routes to connect, wherein a node from each route forming the pair of nodes has a minimum coupling distance. The nodes to be connected are selected from a constrained set of nodes. An embodiment of step 130 will be explained with reference to FIG. 4.

Figure 4:
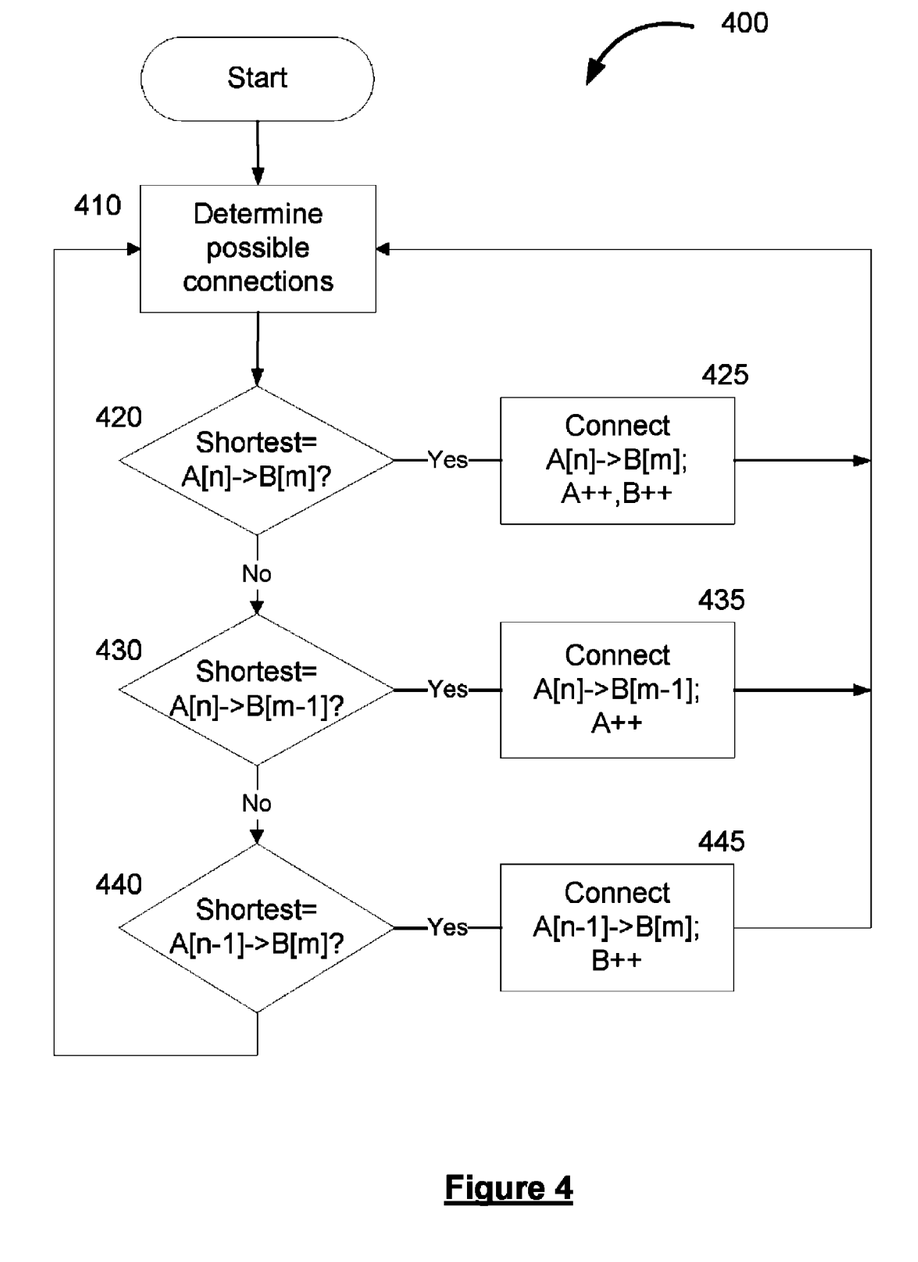
FIG. 4 illustrates a method according to an embodiment of the invention.

Step 410 of the method illustrated in FIG. 4 comprises determining possible connections of the constrained set of nodes. The constrained set of nodes comprises a current node from each route and one or more additional nodes forming each route which are continuous from the current node in a forward direction of the route. In one embodiment the constrained set of nodes comprises the current node of each route and one node forward of the current node, i.e. a next node, although in other embodiments the constrained set may comprise further forward nodes, for example two forward nodes from the current node.

Referring again to FIG. 3, nodes A[1] and B[1] may initially be considered to be the current nodes of each route. The current nodes may be referred to as nodes A[n−1] and B[m−1] respectively. The current nodes are those nodes which are currently connected, as illustrated by connection 331. The set of nodes from which the next nodes to be connected is determined includes, in the exemplary embodiment described, nodes A[n] and B[m] although in other embodiments may comprise further nodes as noted above. Thus in the exemplary embodiment the set of nodes comprises nodes A[1], B[1], A[2] and B[2].

In step 410 all possible connection combinations of the constrained set of nodes are determined. In the exemplary embodiment the possible connections are A[1] and B[2]; A[2] and B[1]; and A[2] and B[2]. In step 410 a length of each possible connection between the pairs of nodes is determined.

In steps 420, 430, 440 a shortest length connection of those determined in step 410 is selected. As will be appreciated, steps 420, 430, 440 are performed sequentially until a shortest of the connections between nodes in the constrained set is found and then one of steps 425, 435, 445 is performed.

Referring again to FIG. 3, in the illustrated example the shortest connection is between nodes A[2] and B[1], thus the method moves to step 435.

In step 435 the connection between nodes A[2] and B[1] is selected as the next connection, denoted as reference 332 by incrementing the current node in route A by one (i.e. A++).

In the next iteration of the method shown in FIG. 4 with respect to the nodes shown in FIG. 3 it is determined in step 420 (remembering in this iteration the current nodes A[n−1] and B[m−1] are nodes A[2] and B[1]) that the shortest connection is between nodes A[n] to B[m] and the method moves to step 425. In step 425, wherein the shortest connection is A[n] to B[m] i.e. between the nodes in each route adjacent or advanced by one from the current nodes, then the current node in both routes is advanced to the next node i.e. by incrementing both nodes in A and B as A++ and B++. This is illustrated in FIG. 3 by the next connection 333 between A[3] and B[2].

When a current node of one route reaches a last node in the route then the method shown in FIG. 4 is adapted to ensure that the next nodes in the other route are sequentially selected. When the current node in both routes is the last node then the method of FIG. 4 ends.

It can therefore be appreciated with reference to FIGS. 3 and 4 how step 130 selects connections from a constrained sets of nodes based upon a current node of each route in contrast to determining connections between all nodes, as in prior art methods which may be computationally inefficient. As a result of step 130 a set of connections is determined, e.g. comprising connections 331, 332, 333, amongst others, which are calculated to represent the shortest coupling distance determined according to embodiments of the invention.

Figure 5:
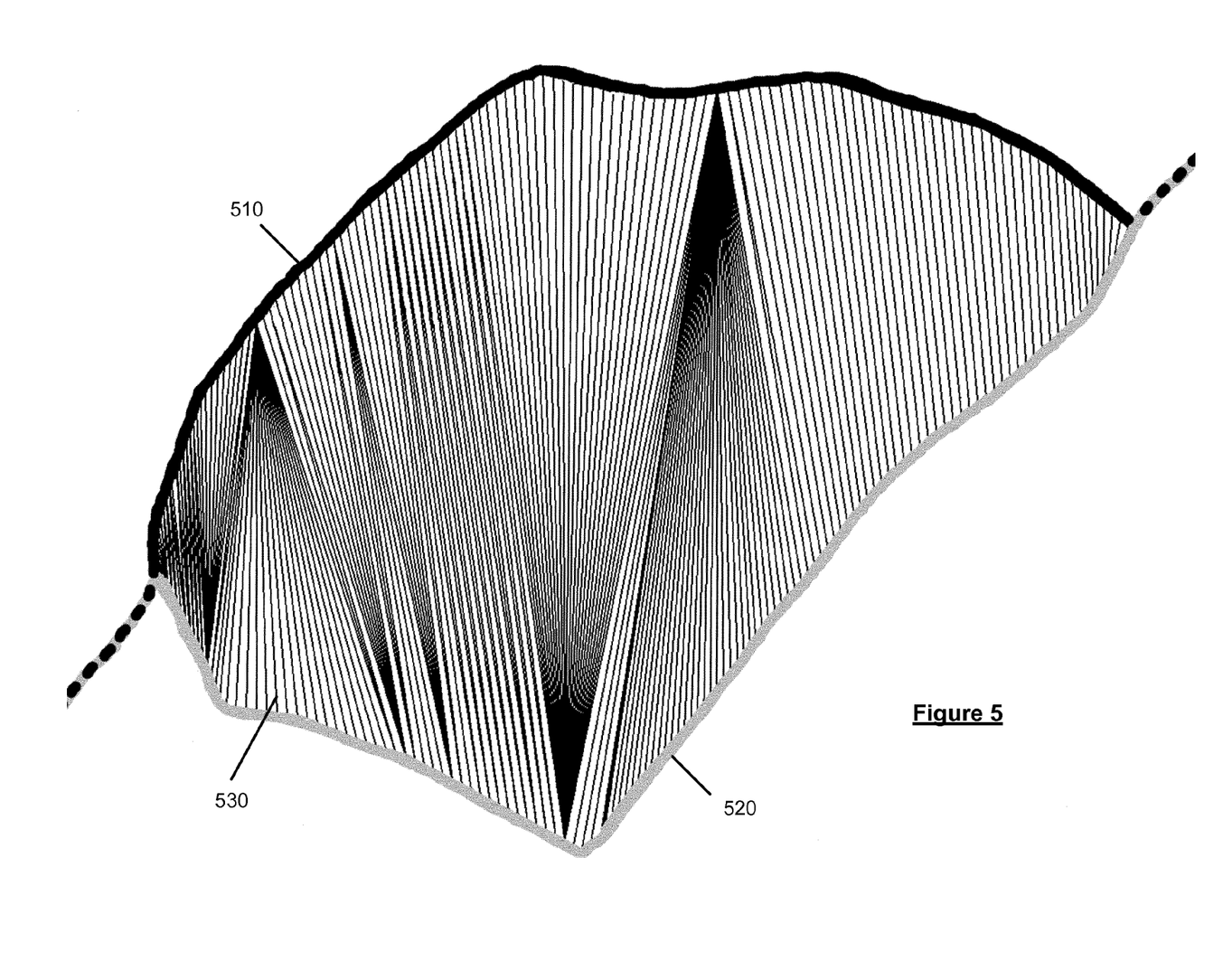
FIGS. 5 and 6 illustrate operation of an embodiment of the invention with respect to routes in digital map data.
Figure 6:
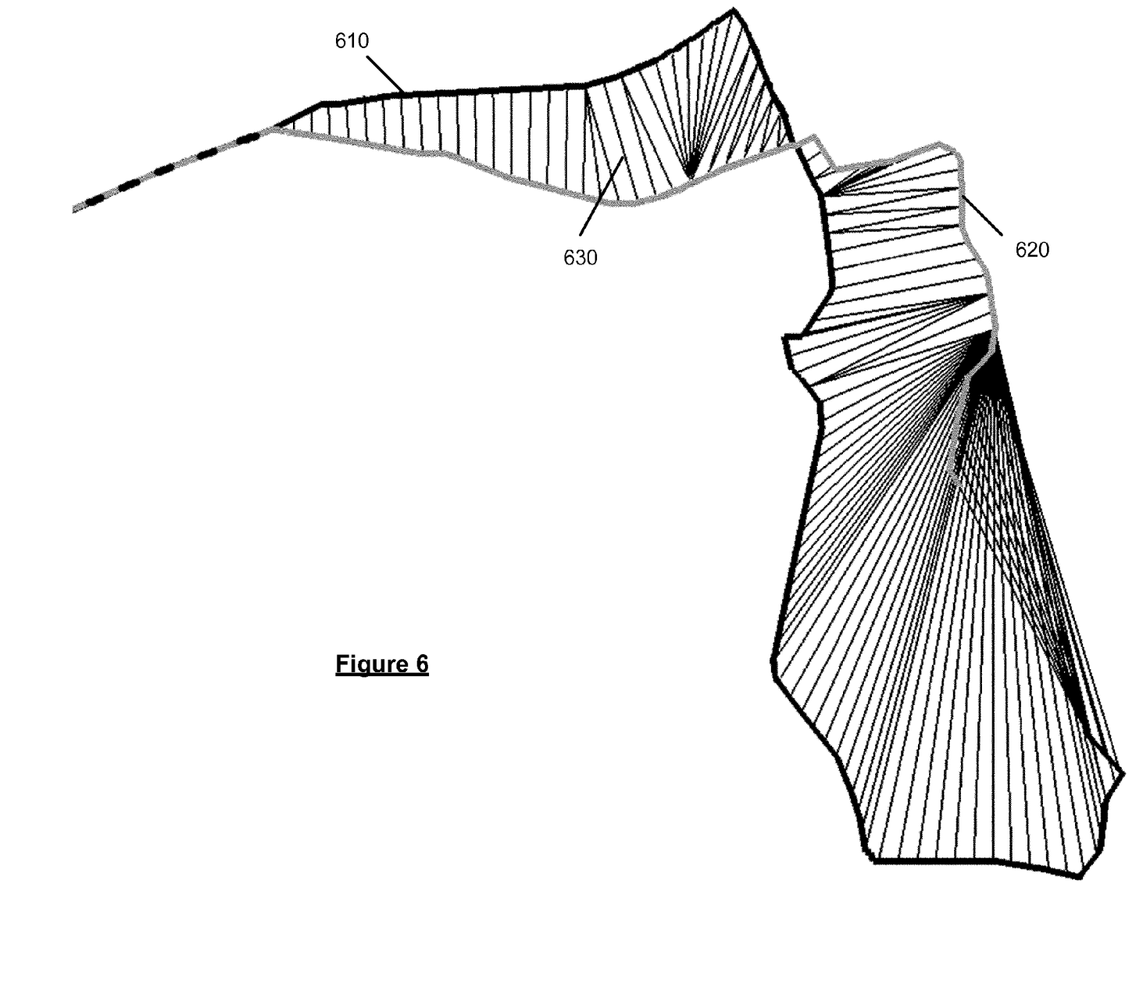

FIGS. 5 and 6 illustrate portions of first and second routes along road segments of digital map data. The first and second routes are denoted 510 and 520 in FIG. 5, and denoted 610 and 620 in FIG. 6. As can be appreciated the first and second routes 510, 520 and 610, 620 deviate by following different road segments for the portion of the route shown. Couplings 530 and 630 between node pairs are also illustrated in FIGS. 5 and 6, respectively, from which it can be observed that some nodes in each route are coupled to a plurality of nodes in the other route.

In step 140 each of the connections determined in step 130 is compared against a threshold coupling distance (TCD). The threshold coupling distance is selected as a maximum coupling distance at which the first and second routes are considered to be similar. In other words, if the threshold coupling distance is exceeded then the routes are considered to be dissimilar at this location. For example, if a length of connection A[2]-B[1]>TCD then a value of a variable indicating the number of connections exceeding the threshold (CTE) is incremented by one (i.e. CTE++) for each connection exceeding TCD in length.

In some embodiments, particularly where the first route is based on first map data and the second route is based on second map data where the first and second map data exhibit a shift having a known shift distance, the TCD may include the shift distance such that it is excluded from comparison of the first and second routes.

In step 150 a similarity index is determined for the first and second routes based on CTE. The similarity index is indicative of a degree of similarity of the first and second routes. The degree of similarity indicates how closely the first and second routes follow each other. In one exemplary embodiment a higher similarity index indicates that the two routes are totally different, i.e. entirely deviate by more than TCD at every node, whereas a lower value is indicative of the routes being similar.

In one embodiment the similarity index S may be calculated as:

$$S = 100 * \frac{CTE}{Total\_connections}$$

where Total_connections is the total number of connections between node pairs. Thus S is a percentage value expressing a similarity of the first and second routes based on coupling distance determined according to an embodiment of the invention.

For example, if there is a difference between the first and second routes of a few meters in a 1000 km route, S will be approximately 0.001% which indicates that the routes are substantially similar.

It will be appreciated that embodiments of the present invention provide a computer-implemented method and apparatus for determining a similarity of routes determined with respect to digital map data based on a comparison of the geometry between the routes. Embodiments of the invention allow a comparison of routes determined by different route calculation algorithms using the same digital map data and/or a comparison of routes determined by the same route calculation algorithm using different digital map data to be performed. In other words, embodiments of the invention can be used, for example, as part of an automated testing procedure for digital map data and/or route calculation algorithms, or to validate downloaded incremental map updates on navigation devices. Furthermore embodiments of the invention utilise fewer computing resources, such as data storage requirements, e.g. memory capacity, and processing resources by computing a reduce number of connections between nodes. Embodiments of the present invention allow calculation of an approximation of the Fréchet distance which has a calculation complexity which scales linearly rather than in a quadratic manner as in the prior art.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A computer implemented method of route comparison, comprising:
receiving, by the computer, data indicative of first and second routes between a start location and a destination location wherein the first and second routes are generated using digital map data;
determining, by the computer, nodes of the first and second routes having a minimum coupling distance, wherein the minimum coupling distance is determined based upon nodes of the first and second routes constrained to within a predetermined distance of a current node of each route; and
determining, by the computer, a similarity index for the first and second routes based upon the minimum coupling distance and a threshold coupling distance.

2. The method of claim 1, wherein the nodes having the minimum coupling distance are determined based upon the current node of each route and a predetermined number of further nodes of the route.

3. The method of claim 2, wherein the nodes having the minimum coupling distance are determined based upon the current node of each route and one further node of the route.

4. The method of claim 1, wherein the nodes having the minimum coupling distance are determined by calculating a coupling distance between the nodes of the first and second routes within the predetermined distance of the current node.

5. The method of claim 1, wherein the nodes having the minimum coupling distance are determined without calculating a coupling distance between all combinations of nodes of the first and second routes.

6. The method of claim 1, wherein the nodes having the minimum coupling are determined by calculating a coupling distance between only a subset of combinations of nodes of the first and second routes.

7. The method of claim 1, wherein determining nodes having the minimum coupling distance comprises selecting a node of each route from amongst the nodes within the predetermined distance of the current node of each route.

8. The method of claim 1, wherein the determining the similarity index for the first and second routes comprises comparing the coupling distance of each pair of nodes against the threshold coupling distance.

9. The method of claim 8, wherein the similarity index indicates a percentage of nodes within the threshold coupling distance.

10. The method of claim 1, wherein the first route is generated using a first map database and the second route is generated using a second map database.

11. The method of claim 10, wherein the first map database and the second map database are equivalent or the first map database is a different version of the second map database.

12. The method of claim 1, comprising interpolating the data indicative of the first and second routes such that each route comprises a node at least every predetermined distance.

13. The method of claim 1 further comprising validating at least one map update on a digital map using the similarity index.

14. A computing device comprising:
 a memory storing data indicative of first and second routes between a start location and a destination location wherein the first and second routes are generated using digital map data; and
 a processor arranged to execute a route comparison module by determining nodes of the first and second routes having a minimum coupling distance, wherein the minimum coupling distance is determined based upon nodes of the first and second routes constrained to within a predetermined distance of a current node of each route, and to determining a similarity index for the first and second routes based upon the minimum coupling distance and a threshold coupling distance.

15. The computing device of claim 14, wherein the route comparison module is arranged to determine the nodes having the minimum coupling distance based upon the current node of each route and a predetermined number of further nodes of the route or based upon the current node of each route and one further node of the route or by calculating a coupling distance between the nodes of the first and second routes within the predetermined distance of the current node.

16. The computing device of claim 14, wherein the route comparison module is arranged to determine the nodes having the minimum coupling distance without calculating a coupling distance between all combinations of nodes of the first and second routes.

17. The computing device of claim 14, wherein the route comparison module is arranged to determine nodes having the minimum coupling distance by calculating a coupling distance between only a subset of combinations of nodes of the first and second routes.

18. The computing device of claim 14, wherein the route comparison module is arranged to determine nodes having the minimum coupling distance by selecting a node of each route from amongst the nodes within the predetermined distance of the current node of each route.

19. The computing device of claim 14, wherein the processor is further arranged to validate at least one map update on a digital map using the similarity index.

20. The computing device of claim 14, wherein the processor is further arranged to conduct an automated testing procedure using the determined similarity index to test the digital map data and/or one or more routing algorithms.

21. A non-transitory computer-readable medium comprising computer readable instructions which, when executed on a computer, is arranged to perform the method of claim 1.

* * * * *